US011568184B2

(12) United States Patent
Oz et al.

(10) Patent No.: US 11,568,184 B2
(45) Date of Patent: Jan. 31, 2023

(54) SYSTEM AND METHOD FOR AUTOMATIC DETECTION OF REFEREE'S DECISIONS IN A BALL-GAME

(71) Applicant: PIXELLOT LTD., Petach Tikva (IL)

(72) Inventors: Gal Oz, Kfar Saba (IL); Yoav Liberman, Tel Aviv (IL)

(73) Assignee: PIXELLOT LTD., Petach Tikva (IL)

( * ) Notice: Subject to any disclaimer, the term of this patent is extended or adjusted under 35 U.S.C. 154(b) by 0 days.

(21) Appl. No.: 16/637,775

(22) PCT Filed: May 22, 2019

(86) PCT No.: PCT/IL2019/050580
§ 371 (c)(1),
(2) Date: Feb. 10, 2020

(87) PCT Pub. No.: WO2019/224821
PCT Pub. Date: Nov. 28, 2019

(65) Prior Publication Data
US 2021/0248415 A1    Aug. 12, 2021

Related U.S. Application Data

(60) Provisional application No. 62/675,190, filed on May 23, 2018.

(51) Int. Cl.
*G06K 9/62* (2022.01)
*G06F 16/55* (2019.01)
(Continued)

(52) U.S. Cl.
CPC .......... *G06K 9/627* (2013.01); *A63B 24/0062* (2013.01); *G06F 16/55* (2019.01);
(Continued)

(58) Field of Classification Search
None
See application file for complete search history.

(56) References Cited

U.S. PATENT DOCUMENTS 9,398,213 B1 *    7/2016   Cronin ............... A63B 71/0605
2003/0122657 A1 *  7/2003  Hodsdon ............ A63B 71/0605
                                                340/323 R
(Continued)

FOREIGN PATENT DOCUMENTS

FR           2843849 A1 *   2/2004   ............ G06T 7/292

OTHER PUBLICATIONS

International Search Report dated Sep. 16, 2019 for corresponding PCT Application No. PCT/IL2019/050580.
(Continued)

*Primary Examiner* — Bernard Krasnic
(74) *Attorney, Agent, or Firm* — Pearl Cohen Zedek Latzer Baratz LLP

(57) ABSTRACT

Generally, a system and method for an automatic detection of referee's decisions during a ball-game match are provided. The method may include receiving a plurality of images of a ball-game field generated during the ball-game match; determining, based on predetermined ball-game rules, a first subset of images of the plurality of images representing a first event that is suspected as a specified rule-based event; determining, based on the predetermine ball-game rules, a second subset of images of the plurality of images that represents a second event, wherein the second event is subsequent to the specified rule-based event according to the predetermined ball-game rules; and analyzing, based on the predetermined ball-game rules, the images of the second subset and further determining, based on the analysis thereof, a referee's decision concerning whether the first even is the specified rule-based event.

15 Claims, 8 Drawing Sheets

(51) Int. Cl.
  *G06F 16/583* (2019.01)
  *A63B 24/00* (2006.01)
  *H04N 5/247* (2006.01)
  *G06V 20/00* (2022.01)
  *A63B 102/22* (2015.01)
  *A63B 71/06* (2006.01)

(52) U.S. Cl.
  CPC .......... *G06F 16/5854* (2019.01); *G06V 20/00* (2022.01); *H04N 5/247* (2013.01); *A63B 71/0669* (2013.01); *A63B 2024/0025* (2013.01); *A63B 2102/22* (2015.10); *A63B 2220/05* (2013.01); *A63B 2220/806* (2013.01); *A63B 2243/0025* (2013.01)

(56) References Cited

U.S. PATENT DOCUMENTS

| | | |
|---|---|---|
| 2003/0182620 A1 | 9/2003 | Errico et al. |
| 2004/0130567 A1 | 7/2004 | Ekin et al. |
| 2009/0060352 A1 | 3/2009 | Distante et al. |
| 2015/0174468 A1 | 6/2015 | Balakrishnan et al. |
| 2015/0297949 A1 | 10/2015 | Aman et al. |
| 2016/0110877 A1* | 4/2016 | Schwartz ............ G06F 16/7867 382/107 |
| 2017/0102480 A1* | 4/2017 | Rosenblum .............. G01V 8/20 |

OTHER PUBLICATIONS

Extended Search Report for EP Patent Application No. 19807664.8, dated Jun. 9, 2021.

* cited by examiner

SYSTEM AND METHOD FOR AUTOMATIC DETECTION OF REFEREE'S DECISIONS IN A BALL-GAME

CROSS-REFERENCE TO RELATED APPLICATIONS

This application is a National Phase Application of PCT International Application No. PCT/IL2019/050580, International Filing Date May 22, 2019, claiming the benefit of U.S. Provisional Patent Application No. 62/675,190, filed May 23, 2018, which is hereby incorporated by reference.

FIELD OF THE INVENTION

The present invention relates to the field of automatic analysis of a sporting match, and more particularly, to systems and methods for automatic detection of referee's decisions during a sporting match.

BACKGROUND OF THE INVENTION

Nowadays, a final decision concerning a rule-based event in a sporting match is made by a referee. Some current systems for an analysis of sporting matches may detect an event that are suspected as a rule-based event. Referring to soccer as example, such systems may, for example, detect an event in which a ball passes completely over a goal line between a goal posts and under a crossbar, and further determine the event thereof as a scoring event. However, the detected event may be committed while violating predetermined ball-game rules (e.g., due to a foul and/or offside), and thus may be disqualified by the referee. Some current systems for an analysis of sporting matches may further generate event-related data concerning the detected event (e.g., that is suspected as the rule-based event) and further deliver the event-related data to a referee to help the referee with a decision-making concerning the event thereof.

One disadvantage of current systems for an analysis of sporting matches is that they at best enable detection of events that are suspected as rule-based events. Nowadays, these detected events may not be directly considered as rule-based events, as they should be approved by the referee.

SUMMARY OF THE INVENTION

One aspect of the present invention provides a system for an automatic detection of referee's decisions during a ball-game match, the system comprising: a database comprising a plurality of images of a ball-game field generated during the ball-game match; an events detection module coupled to the database, the events detection module to: determine, based on predetermined ball-game rules, a first subset of images of the plurality of images representing a first event that is suspected as a specified rule-based event, and determine, based on the predetermine ball-game rules, a second subset of images of the plurality of images that represents a second event, wherein the second event is subsequent to the specified rule-based event according to the predetermined ball-game rules; an events analysis module coupled to the events detection module, the events analysis module to analyze, based on the predetermined ball-game rules, the images of the second subset and further to determine, based on the analysis thereof, a referee's decision concerning whether the first even is the specified rule-based event.

Another aspect of the present invention provides a method of an automatic detection of referee's decisions during a ball-game match, the method comprising: receiving a plurality of images of a ball-game field generated during the ball-game match; determining, by an events detection module, based on predetermined ball-game rules, a first subset of images of the plurality of images representing a first event that is suspected as a specified rule-based event; determining, by an events detection module, based on the predetermine ball-game rules, a second subset of images of the plurality of images that represents a second event, wherein the second event is subsequent to the specified rule-based event according to the predetermined ball-game rules; and analyzing, by an events analysis module, based on the predetermined ball-game rules, the images of the second subset and further determining, based on the analysis thereof, a referee's decision concerning whether the first even is the specified rule-based event.

Another aspect of the present invention provides a system for an automatic detection of referee's decisions concerning scoring events during a ball-game match, the system comprising: a database comprising a plurality of images of a ball-game field generated during the ball-game match; an events detection module coupled to the database, the events detection module to: determine, based on predetermined ball-game rules, a first subset of images of the plurality of images representing a first event that is suspected as a scoring event, and determine, based on the predetermine ball-game rules, a second subset of images of the plurality of images that represents a second event, wherein the second event is subsequent to the scoring event according to the predetermined ball-game rules; an events analysis module coupled to the events detection module, the events analysis module to analyze, based on the predetermined ball-game rules, the images of the second subset and further to determine, based on the analysis thereof, a referee's decision concerning whether the first even is the specified rule-based event.

Another aspect of the present invention provides a method of an automatic detection of referee's decisions concerning scoring events during a ball-game match, the method comprising: receiving a plurality of images of a ball-game field generated during the ball-game match; determining, by an events detection module, based on predetermined ball-game rules, a first subset of images of the plurality of images representing a first event that is suspected as a scoring event; determining, by an events detection module, based on the predetermine ball-game rules, a second subset of images of the plurality of images that represents a second event, wherein the second event is subsequent to the scoring event according to the predetermined ball-game rules; and analyzing, by an events analysis module, based on the predetermined ball-game rules, the images of the second subset and further determining, based on the analysis thereof, a referee's decision concerning whether the first even is the specified rule-based event.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

and

Figure 3:
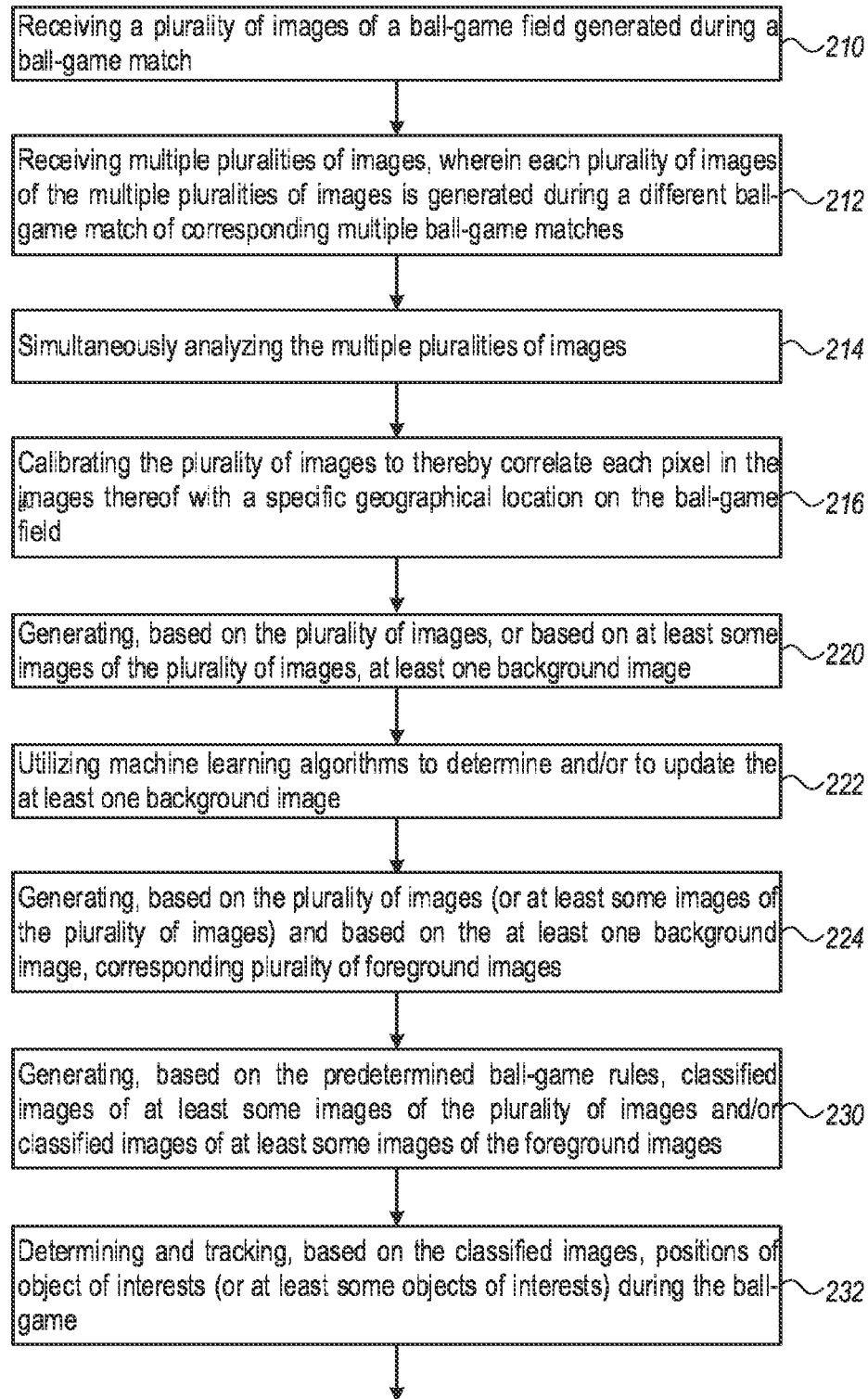
Figure 3:
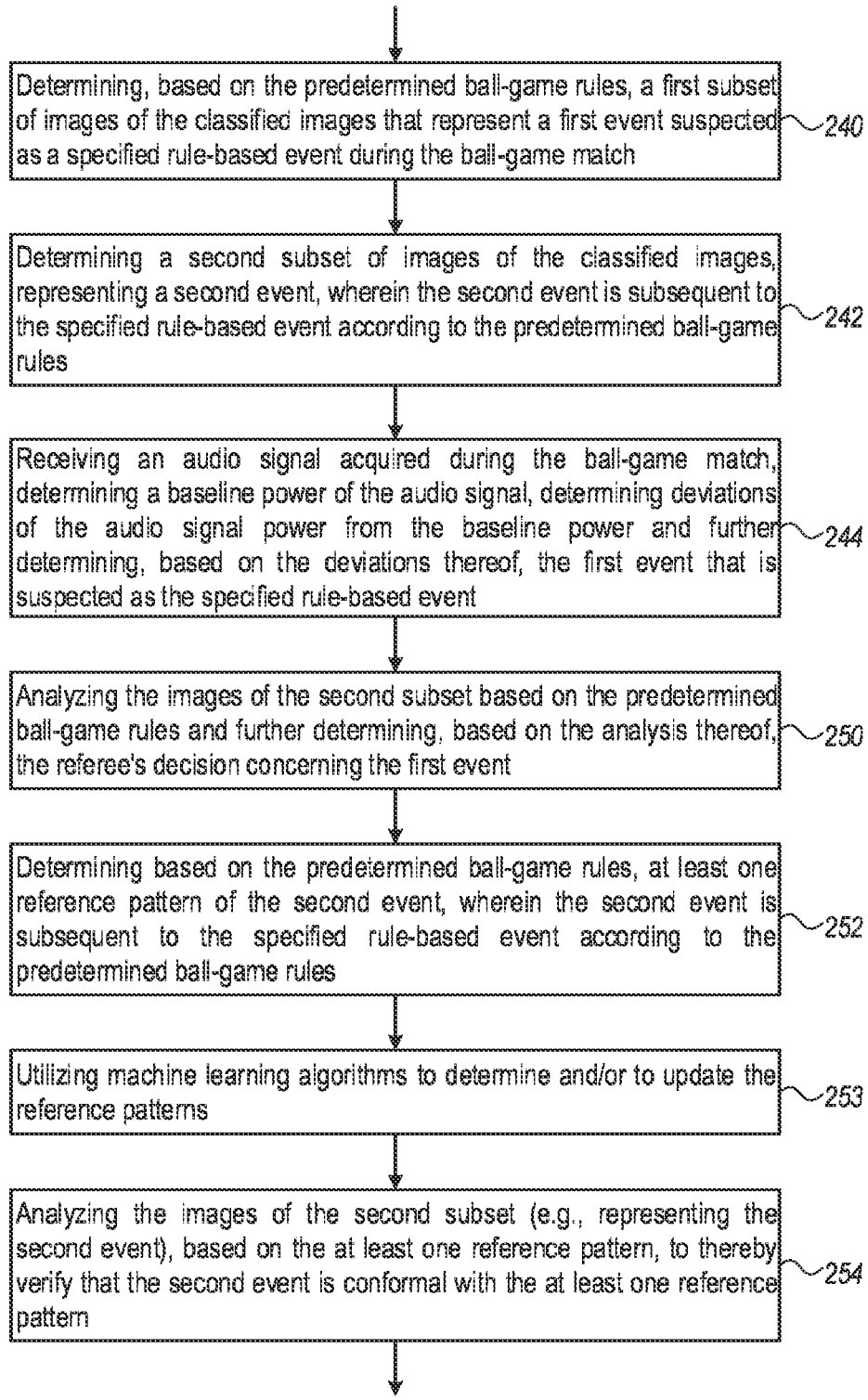
Figure 3:
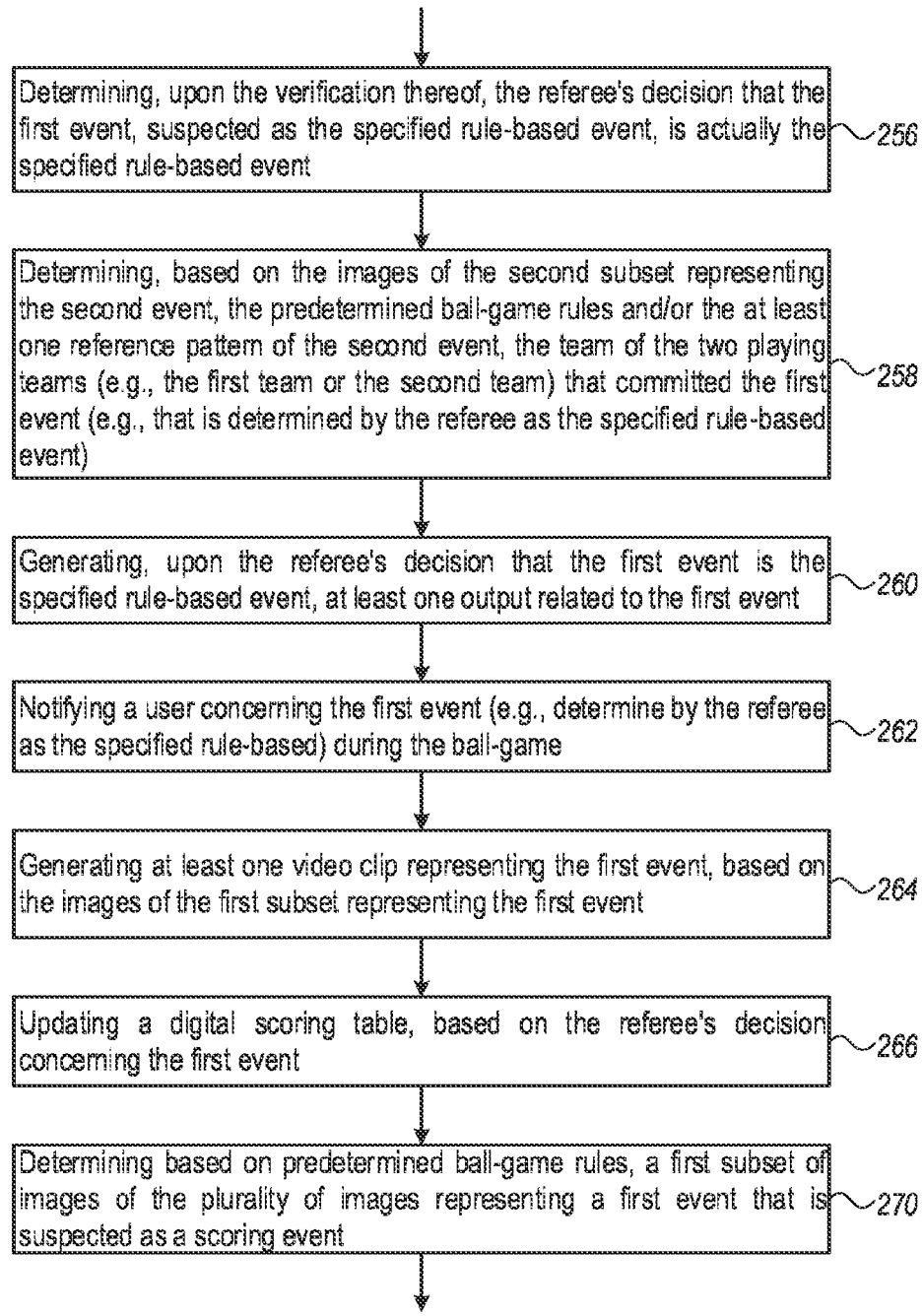
Figure 3:
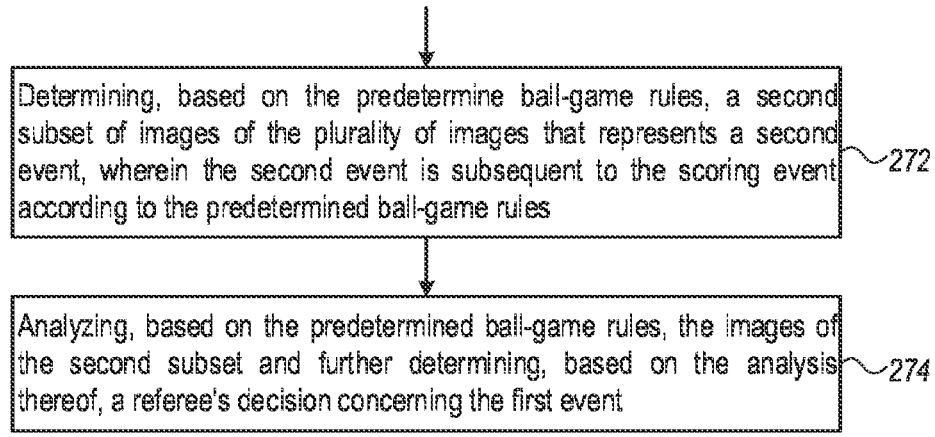

FIG. 3 is a flowchart of a method of an automatic detection of referee's decisions during a ball-game match, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Generally, a system and method for an automatic detection of referee's decisions during a ball-game match are provided. The method may include receiving a plurality of images of a ball-game field generated during the ball-game match. In various embodiments, the plurality of images may be generated in real-time, e.g., during the actual ball game match, or the images may be offline pre-recorded images. The method may further include determining, e.g. by an events detection module, based on predetermined ball-game rules, a first subset of images of the plurality of images representing a first event that is suspected as a specified rule-based event (e.g., scoring event). The method may further include determining, e.g. by an events detection module, based on the predetermine ball-game rules, a second subset of images of the plurality of images that represents a second event, wherein the second event is subsequent to the specified rule-based event according to the predetermined ball-game rules. The method may further include analyzing, e.g. by an events analysis module, based on the predetermined ball-game rules, the images of the second subset and further determining, based on the analysis thereof, a referee's decision concerning whether the first event is the specified rule-based event.

Figure 1A:
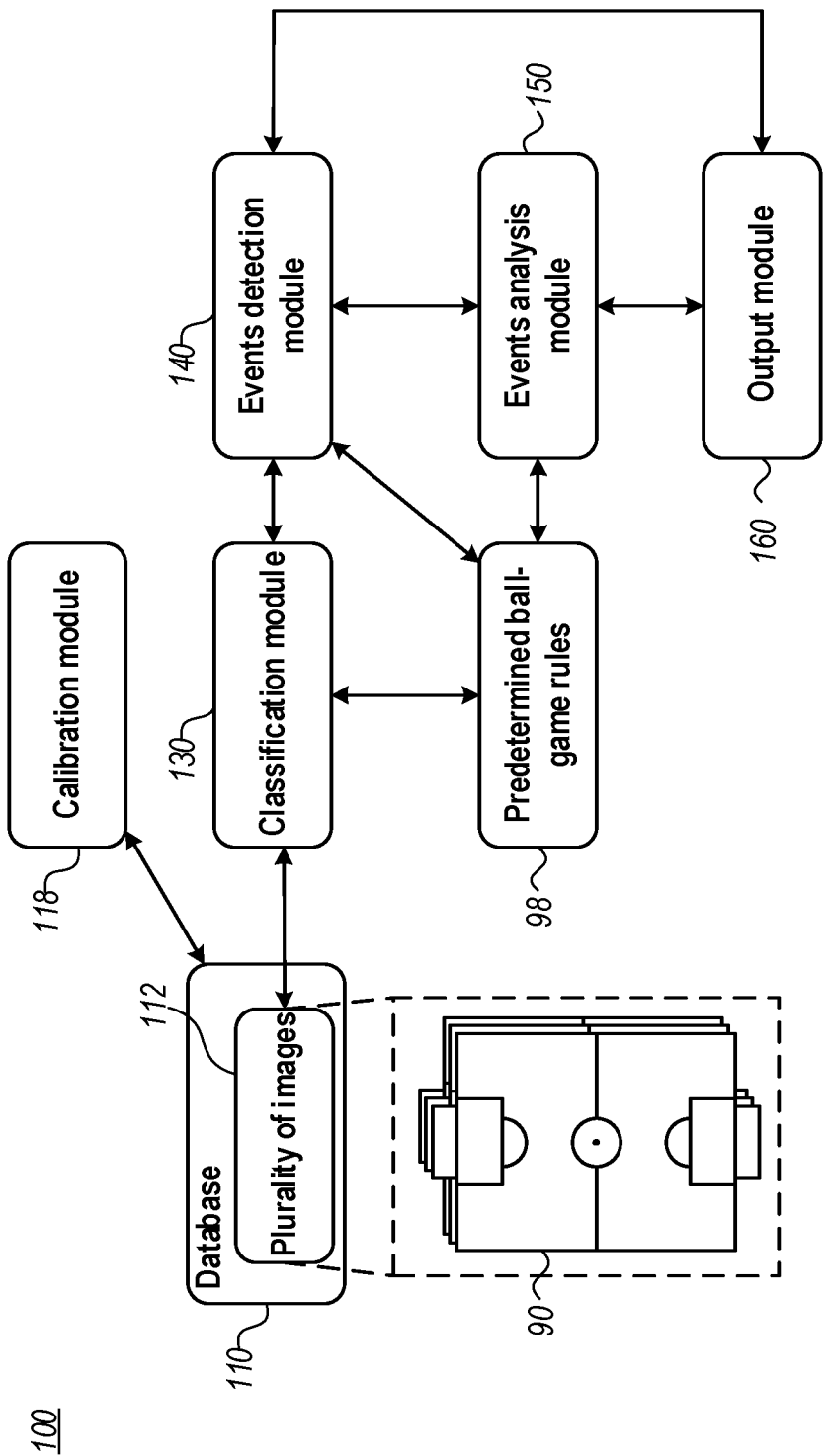
FIGS. 1A-1C are various configurations of a system for an automatic detection of referee's decisions during a ball-game match, according to some embodiments of the invention.
Figure 1B:
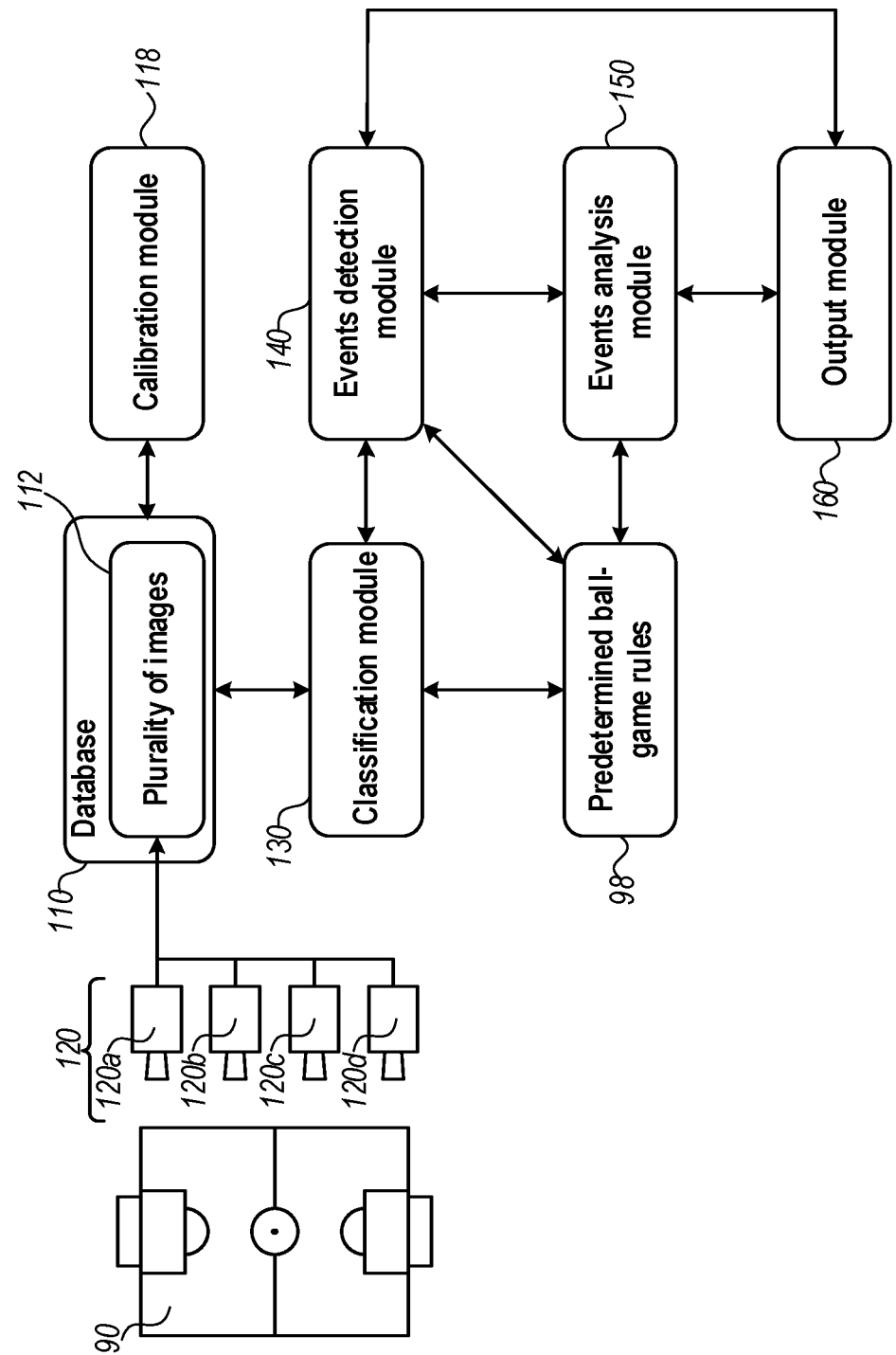
Figure 1C:
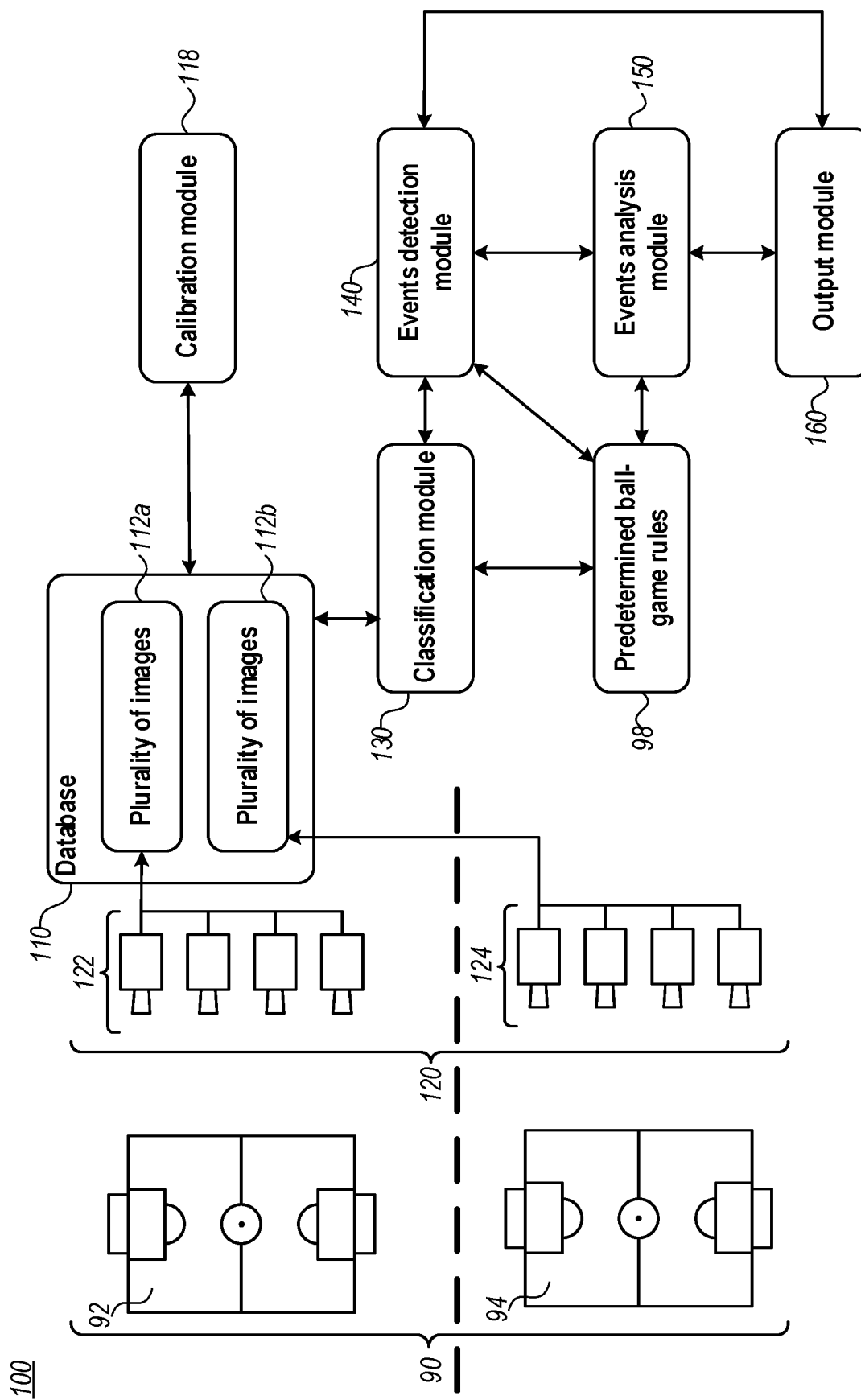
Figure 2B:
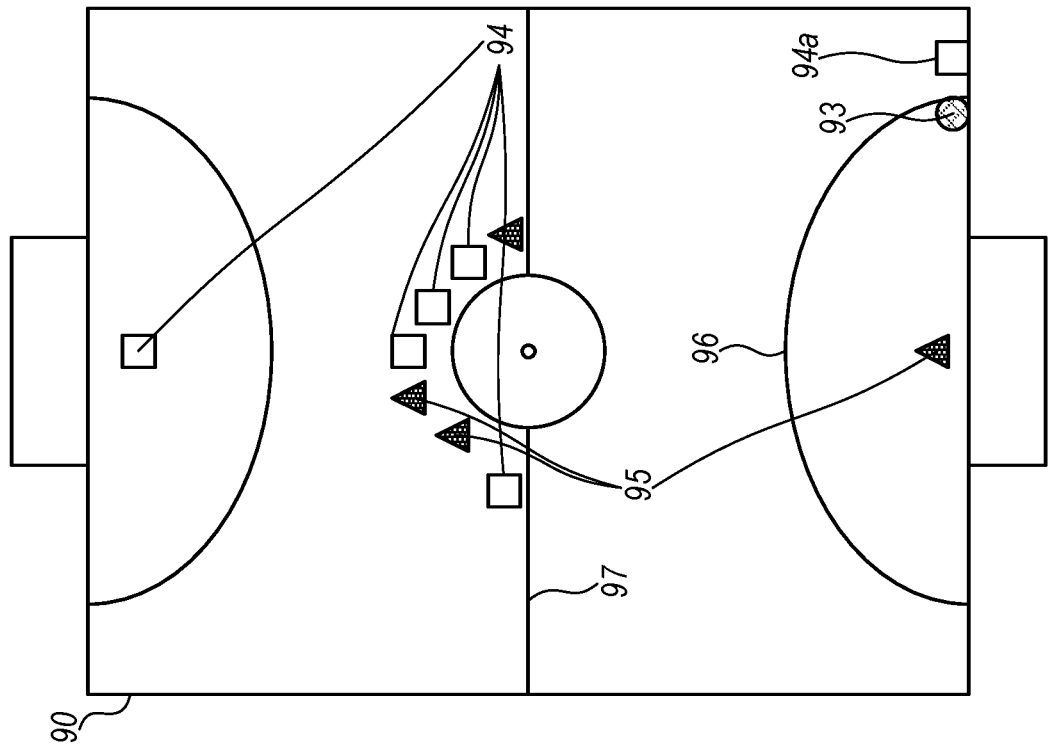
FIG. 2A and FIG. 2B are schematic illustrations of reference patterns of specific second events in soccer and in field hockey, respectively, according to some embodiments of the invention.
Figure 2A:
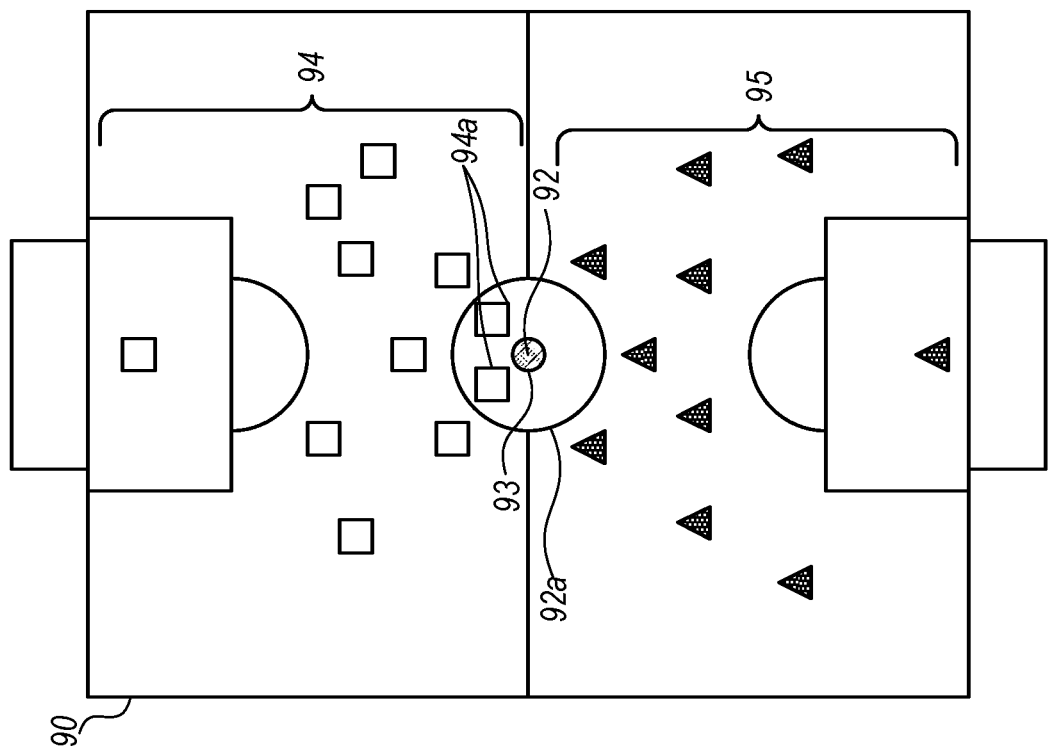

Reference is now made to FIGS. 1A-1C, which are various configurations of a system 100 for an automatic detection of referee's decisions during a ball-game match, according to some embodiments of the invention; and to FIG. 2A and FIG. 2B which are reference patterns of specific second events in soccer and in field hockey, respectively, according to some embodiments of the invention.

System 100 may include a database 110. Database 110 may include a plurality of images 112 of a ball-game field 90, generated during a ball-game match (e.g., as shown in FIG. 1A).

It is noted that the term "ball-game" as used herein in this application may refer to any ball-game having predetermined ball-game rules, such as, but not limited to soccer, basketball, football, hockey, field hockey, etc.

In some embodiments, images 112 may be generated in real-time, during the actual ball-game match. Alternatively or complementarily, images 112 may be pre-recorded (e.g., during a ball-game match) and stored in database 110 for further analysis.

In some embodiments, system 100 may include at least one set 120 of at least one camera. For example, set 120 may include a first camera 120a, a second camera 120b, a third camera 120c and/or a fourth camera 120d (e.g., as shown in FIG. 1B). The camera(s) of set 120 may be positioned at predetermined locations on ball-game field 90. The camera (s) of set 120 may generate plurality of images 112 of ball-game field 90, in real-time, during the actual ball-game match, and to deliver the plurality of generated images 112 to database 110. In various embodiments, the camera(s) of set 120 may be panoramic camera(s), stationary camera(s) or dynamic camera(s).

In some embodiments, system 100 includes multiple sets 120 of at least one camera. Each of multiple sets 120 may be located at a different ball-game field of corresponding multiple ball-game-fields 90 to, for example, simultaneously generate corresponding multiple plurality of images of corresponding multiple ball-game matches taking place on corresponding multiple ball-game fields 90.

For example, system 100 may include a first set 122 of at least one camera located at a first ball-game field 90a and a second set 124 of at least one camera located at a second ball-game field 90*b* (e.g., as shown in FIG. 1C). First set 122 of camera(s) may generate a first plurality of images 112*a* of first ball-game field 90*a* during a first ball-game match and/or second set 124 of camera(s) may generate a second plurality of images 112*b* of second ball-game field 90*b* during a second ball-game match. Both first set 122 of camera(s) and second set 124 camera(s) may further deliver first plurality of images 112*a* and second plurality of images 112*b*, respectively, to database 110.

In some embodiments, system 100 is capable to simultaneously analyze multiple pluralities of images 112 (e.g., first plurality of images 112*a* and second plurality of images 112*b*) corresponding to multiple ball-game matches (e.g., the first game-ball match and the second ball-game match).

System 100 may include a calibration module 118. Calibration module 118 may be coupled to database 110 (e.g., as shown in FIGS. 1A-1C). Calibration module 118 may calibrate each image of plurality of images 112 (or at least some images of plurality of images) to thereby associate each pixel in the images thereof with a specific geographical location on ball-game field 90.

System 100 may include a classification module 130. Classification module 130 may be coupled to database 110 and/or may receive plurality of images 112 from database 110 (e.g., as shown in FIGS. 1A-1C).

Classification module 130 may determine, based on plurality of images 112, or at least some images of plurality of images 112, at least one background image. Classification module 130 may further generate, based on plurality of images 112 (or at least some images of plurality of images 112) and based on the at least one background image, corresponding plurality of foreground images. For example, classification module 130 may subtract the at least one background image from each image of plurality of images 112 (or at least some images of plurality of images 112) to thereby generate corresponding foreground image.

In some embodiments, the at least one background image includes stationary (or substantially stationary) objects related to the ball-game. For example, the at least one background image may include pixels representing ball-game field 90. In various embodiments, classification module 130 utilizes machine learning algorithms to determine and/or to update the at least one background image.

In some embodiments, the foreground images include objects of interest related to the ball-game. For example, the foreground images may include moving objects, such as players of a first team, players of a second team and/or a ball.

Classification module 130 may generate classified images of at least some images of plurality of images 112 and/or classified images of at least some images of the foreground images. In some embodiments, the classified images may be determined based on predetermined ball-game rules 98. In some embodiments, each image of the classified images may include multiple patches of pixels, wherein each patch of pixels of the multiple patches of pixels may be represented as a specific class of objects of predetermined classes of objects related to the ball-game. For example, in soccer, the predetermined classes of objects may include the first team players, the second team players, the ball and/or referees. In some embodiments, classification module 130 filters at least some images of the classified images to thereby enhance the multiple patches of pixels in the images thereof.

System 100 may include an events detection module 140. Events detection module 140 may be coupled to classification module 130 and/or may receive the classified images from classification module 130 (e.g., as shown in FIGS. 1A-1C).

Events detection modules 140 may determine and track, based on plurality of images 112 or based on the classified images, positions of the object of interest (or at least some objects of interest) during the ball-game. For example, events detection module 140 may track positions of the first team players, the second team players and/or the ball during the ball-game. In some embodiments, events detection module 140 saves and stores the determined tracked positions of the objects of interest.

Events detection module 140 may further determine, based on predetermined ball-game rules 98 and a first subset of images of plurality of images 112 or a first subset of the classified images, that represent a first event suspected as a specified rule-based event (e.g., a foul and/or a scoring event) during the ball-game match.

For example, the specified rule-based event may be a scoring event in soccer. In this case, the first event may include a complete crossing of the ball over the goal line between the goal posts and under the crossbar, or at least kicking of the ball on goal. However, the first event may not be certainly identified as scoring event, as it may be committed while violating at least one of predetermined ball-game rules 98. For example, a player of a scoring team could commit a foul, or a player that got the ball to the goal could be in an offside position.

Nowadays, the final decision concerning the rule-based events in ball-games (e.g., soccer) is made by the referee. Thus, it is required to detect a referee's decision concerning the first event in order to determine whether the first event is actually the specified rule-based event. System 100 may further track (e.g., by events detection module 140) subsequent events that may take place during the ball-game match, and further may determine, based on at least one of the subsequent events and predetermined ball-game rules 98, the referee's decision concerning the first event (e.g., whether the first event is the specified rule-based event).

Events module 140 may further determine a second subset of images of plurality of images 112, or a second subset of the classified images, that represent a second event, wherein the second event is subsequent to the specified rule-based event according to predetermined ball-game rules 98. For example, the specified rule-based event may be the scoring event in soccer and the first event may be suspected as the scoring event thereof (e.g., as described above). In this case, the second event may include restarting the play from a center spot of ball-game field 90 (e.g., a kick-off).

In some embodiments, database 110 includes an audio signal acquired during the ball-game match. Events detection module 140 may receive the audio signal from database 110 and determine a baseline power of the audio signal during the ball-game match. In some embodiments, events detection module 110 may further determine deviations of the audio signal power from the baseline power and further determine, based on the deviations thereof, the first event that is suspected as the specified rule-based event. For example, if the audio signal power exceeds a predetermined threshold value above the baseline power it may be, in some embodiments, an indication of the specified rule-based event.

System 100 may include an events analysis module 150. Events analysis module 150 may be coupled to events detection module 140. Events analysis module 150 may analyze the images of the second subset based on predetermined ball-game rules 98 and may further determine, based on the analysis thereof, the referee's decision concerning the first event (e.g., whether the first event is the specified rule-based event).

Events analysis module 150 may determine, based on predetermined ball-game rules 98, at least one reference pattern of the second event, wherein the second event is subsequent to the specified rule-based event according to predetermined ball-game rules 98. Events analysis module 150 may further analyze the images of the second subset (e.g., representing the second event), based on the at least one reference pattern, to thereby verify that the second event is conformal with the at least one reference pattern. Events analysis module 150 may further determine, upon the verification thereof, the referee's decision concerning the first event (e.g., whether the first event, suspected as the specified rule-based event, is actually the specified rule-based event).

For example, FIG. 2A shows the at least one reference pattern for the second event that includes restarting the play from a center spot 92 of ball-game field 90 that occurs upon a scoring event in soccer. In this case, the at least one reference pattern of the second event may include at least the following: (i) the ball 93 is at the center spot 92 of ball-game field 90; (ii) only two players 94a of the same team 94 are in a center circle 92a of ball-field 90 and the ball 93 is between the two players 94a thereof; (iii) the first team players 94 and the second team players 95 are stationary (or substantially stationary); and/or (iv) the first team players 94 and the second team players 95 are all at opposite halves of ball-game field 90 (e.g., as shown FIG. 2A).

In another example, FIG. 2B shows the at least one reference pattern for the second event that includes a penalty corner in field hockey, upon a foul committed by a defending team 95 in a penalty circle 96 of ball-game field 90. In this case, the at least one reference pattern of the second event may include at least the following: (i) a maximum of five defending players line up behind the back line either in the goal or on the back line at least five meters from the ball; (ii) all other players of the defending team 95 are behind the center line of ball-game field 90; (iii) one attacking player 94a places himself on the back line, with the ball 93 in the circle at least 10 meters from the nearest goal post on either side of the goal; (iv) the remainder of the attacking team players 94 place themselves on the field outside of the shooting circle; and (v) all players other than the attacking player 94a on the back line must not have any part of their body or stick touch the ground inside the circle or over the center line 97 until the ball 93 is in play (e.g., as show in FIG. 2B).

In various embodiments, events analysis module 150 determines, based on the images of the second subset representing the second event, predetermined ball-game rules 98 and/or the at least one reference pattern of the second event, the team of the two playing teams (e.g., the first team or the second team) that committed the first event (e.g., that was determined by the referee as the specified rule-based event). Referring back to example of the scoring event in soccer (e.g., as described above), events analysis module 150 may determine, based on the images of the second subset representing the second event, the team that restarts the play from the center spot of ball-field 90 (e.g., by determining a dressing color of the players in the center circle), and further determine, based on predetermined ball-game rules 98, that the opponent team scored the goal.

In some embodiments, events analysis module 150 includes multiple at least one reference patterns that correspond to multiple specified rule-based events in the ball-game (e.g., fouls, offsides, scorings, etc.). In some embodiments, the reference patterns are determined based on predetermined ball-game rules 98. In various embodiments, events analysis module 150 utilizes machine learning algorithms to determine and/or to update the reference patterns thereof.

System 100 may include an output module 160. Output module 160 may be coupled to events analysis module 150 and/or to events detection module 140 (e.g., as shown in FIGS. 1A-1C). Output module 160 may generate, based on the determined referee's decision concerning the first event, at least one output related to the first event.

In some embodiments, the at least one output includes a notification concerning the first event/the specified rule-based event during the ball-game. The notification thereof may be, for example, delivered to at least one user of system 100.

In some embodiments, the at least one output includes at least one video clip representing the first event. For example, output module 160 may receive, from events detection module 140 or from events analysis module 150, the images of the first subset representing the first event, and further generate, based on the images of the first subset, corresponding at least one video clip representing the first event. In some embodiments, output module 160 may update a digital specified rule-based events table, based on the referee's decision concerning the first event.

According to some embodiments, system 100 is arranged to automatically detect the referee's decisions concerning scoring events during the ball-game match. Events detection module 140 may determine, based on predetermined ball-game rules 98, the first subset of images of the plurality of images representing the first event that is suspected as a scoring event (e.g., as described above with respect to FIGS. 1A-1C). In some embodiments, the first event takes place at a goal region (e.g., one of two goal regions) on ball-game field 90.

Events detection module 140 may further determine, based on the predetermine ball-game rules, a second subset of images of the plurality of images that represents the second event, wherein the second event is subsequent to the scoring event according to the predetermined ball-game rules, (e.g., as described above with respect to FIGS. 1A-1C). In some embodiments, the second event takes place at a specific region on ball-game field 90. In some embodiments, the specific region is not the goal region. For example, the specific region may be a predetermined area around the central spot of ball-game field 90 (e.g., as described above with respect to FIG. 2A).

Events analysis module 150 may analyze, based on the predetermined ball-game rules, the images of the second subset and further to determine, based on the analysis thereof, the referee's decision concerning the first event (e.g., whether the first event is the specified rule-based event; as described above with respect to FIGS. 1A-1C).

Reference is now made to FIG. 3, which is a flowchart of a method 200 of an automatic detection of referee's decisions during a ball-game match, according to some embodiments of the invention.

Method 200 may be implemented by system 100 that may be arranged to implement method 200. It is noted that method 200 is not limited to the flowchart illustrated in FIG. 3 and to the corresponding description. For example, in various embodiments, method 200 needs not move through each illustrated box or stage, or in exactly the same order as illustrated and described.

Method 200 may include receiving (stage 210) a plurality of images of a ball-game field generated during a ball-game match. In various embodiments, the plurality of images are real-time images being acquired during the actual ball-game match or the plurality of images are offline images pre-recorded during the ball-game match (e.g., as described above with respect to FIGS. 1A-1C).

In some embodiments, method 200 includes receiving (stage 212) multiple pluralities of images, wherein each plurality of images of the multiple pluralities of images is generated during a different ball-game match of corresponding multiple ball-game matches (e.g., as described above with respect to FIGS. 1A-1C). In some embodiments, method 200 includes simultaneously analyzing (stage 214) the multiple pluralities of images (e.g., as described above with respect to FIGS. 1A-1C).

Method 200 may include calibrating (stage 216) the plurality of images to thereby correlate each pixel in the images thereof with a specific geographical location on the ball-game field (e.g., by calibration module 118, as described above with respect to FIGS. 1A-1C).

Method 200 may include generating (stage 220), based on the plurality of images, or based on at least some images of the plurality of images, at least one background image (e.g., by classification module 130, as described above with respect to FIGS. 1A-1C). In some embodiments, method 200 includes utilizing machine learning algorithms to determine and/or to update the at least one background image (stage 222).

In some embodiments, method 200 includes generating (stage 224), based on the plurality of images (or at least some images of the plurality of images) and based on the at least one background image, corresponding plurality of foreground images (e.g., by classification module 130, as described above with respect to FIGS. 1A-1C).

Method 200 may include generating (stage 230), based on the predetermined ball-game rules, classified images of at least some images of the plurality of images and/or classified images of at least some images of the foreground images (e.g., by classification module 130, as described above with respect to FIGS. 1A-1C). In some embodiments, each image of the classified images includes multiple patches of pixels, wherein each patch of pixels of the multiple patches of pixels is be represented as a specific class of objects of predetermined classes of objects related to the ball-game (e.g., as described above with respect to FIGS. 1A-1C).

Method 200 may include determining and tracking (stage 232), based on the plurality of images, or based on the classified images, positions of object of interests (or at least some objects of interests) during the ball-game (e.g., by events detection module 140, as described above with respect to FIGS. 1A-1C).

Method 200 may include determining (stage 240), based on the predetermined ball-game rules, a first subset of images of the plurality of images, or of the classified images, that represent a first event suspected as a specified rule-based event during the ball-game match (e.g., by events detection module 140, as described above with respect to FIGS. 1A-1C). In some embodiments, the specified rule-based event is a scoring event.

Method 200 may include determining (stage 242) a second subset of images of the plurality of images, or of the classified images, that represent a second event, wherein the second event is subsequent to the specified rule-based event according to the predetermined ball-game rules (e.g., by events detection module 140, as described above with respect to FIGS. 1A-1C).

In some embodiments, method 200 includes receiving (stage 244) an audio signal acquired during the ball-game match, determining a baseline power of the audio signal, determining deviations of the audio signal power from the baseline power and further determining, based on the deviations thereof, the first event that is suspected as the specified rule-based event (e.g., by events detection module 140, as described above with respect to FIGS. 1A-1C).

Method 200 may include analyzing (stage 250) the images of the second subset based on the predetermined ball-game rules and further determining, based on the analysis thereof, the referee's decision concerning the first event (e.g., whether the first event is the specified rule-based event) (e.g., by events analysis module 150, as described above with respect to FIGS. 1A-1C).

In some embodiments, method 200 includes determining (stage 252) based on the predetermined ball-game rules, at least one reference pattern of the second event, wherein the second event is subsequent to the specified rule-based event according to the predetermined ball-game rules (e.g., by events analysis module 150, as described above with respect to FIGS. 1A-1C and FIGS. 2A-2B). In some embodiments, method 200 includes utilizing machine learning algorithms to determine and/or to update the reference patterns thereof (stage 253).

In some embodiments, method 200 includes analyzing (stage 254) the images of the second subset (e.g., representing the second event), based on the at least one reference pattern, to thereby verify that the second event is conformal with the at least one reference pattern (e.g., by events analysis module 150, as described above with respect to FIGS. 1A-1C).

In some embodiments, method 200 includes determining (stage 256), upon the verification thereof, the referee's decision that the first event, suspected as the specified rule-based event, is actually the specified rule-based event (e.g., by events analysis module 150, as described above with respect to FIGS. 1A-1C).

In various embodiments, method 200 includes determining (stage 258), based on the images of the second subset representing the second event, the predetermined ball-game rules and/or the at least one reference pattern of the second event, the team of the two playing teams (e.g., the first team or the second team) that committed the first event (e.g., that is determined by the referee as the specified rule-based event) (e.g., by events analysis module 150, as described above with respect to FIGS. 1A-1C).

Method 200 may include generating (stage 260), based on the determined referee's decision that the first event is the specified rule-based event, at least one output related to the first event (e.g., by output module 160, as described above with respect to FIGS. 1A-1C).

In some embodiments, method 200 includes notifying (stage 262) a user concerning the first event (e.g., determine by the referee as the specified rule-based) during the ball-game (e.g., by output module 160, as described above with respect to FIGS. 1A-1C).

In some embodiments, method 200 includes generating (stage 264) at least one video clip representing the first event, based on the images of the first subset representing the first event (e.g., by output module 160, as described above with respect to FIGS. 1A-1C).

In some embodiments, the specified rule-based event is a scoring event and method 200 includes updating (stage 266) a digital scoring table, based on the referee's decision concerning the first event (e.g., by output module 160, as described above with respect to FIGS. 1A-1C).

According to some embodiments, method 200 may automatically detect referee's decisions concerning scoring events during the ball-game match. Method 200 may include determining (stage 270), e.g., by an events detection module 140, based on predetermined ball-game rules, a first subset of images of the plurality of images representing a first event that is suspected as a scoring event (e.g., as described above with respect to FIGS. 1A-1C).

Method 200 may include determining (stage 272), e.g., by an events detection module 140, based on the predetermine ball-game rules, a second subset of images of the plurality of images that represents a second event, wherein the second event is subsequent to the scoring event according to the predetermined ball-game rules (e.g., as described above with respect to FIGS. 1A-1C).

Method 200 may include analyzing (stage 274), e.g., by an events analysis module 150, based on the predetermined ball-game rules, the images of the second subset and further determining, based on the analysis thereof, a referee's decision concerning the first event (e.g., as described above with respect to FIGS. 1A-1C).

Advantageously, the disclosed systems and methods may enable an automatic detection of referee's decisions concerning rule-based events during the ball-game match, thus overcoming the disadvantages of current systems for an analysis of sporting events. The disclosed automatic systems and methods may further enable simultaneous analysis of multiple ball-game matches taking place at multiple ball-game fields.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for an automatic detection of referee's decisions during a ball-game match, the system comprising:
   a database comprising a plurality of images of a ball-game field generated during the ball-game match;
   an events detection module coupled to the database, the events detection module to:
      determine, based on predetermined ball-game rules, a first subset of images of the plurality of images representing a first event that is suspected as a specified rule-based event, and
      determine, based on the predetermined ball-game rules, a second subset of images of the plurality of images that represents a second event, wherein the second event is subsequent to the specified rule-based event according to the predetermined ball-game rules;
   an events analysis module coupled to the events detection module, the events analysis module to analyze, based on the predetermined ball-game rules, the images of the second subset and further to determine, based on the analysis thereof, a referee's decision concerning whether the first event is the specified rule-based event; and multiple sets of at least one camera, wherein each of the multiple sets thereof is located at a different ball-game field of corresponding multiple ball-game fields, and configured to generate corresponding multiple pluralities of images of corresponding multiple ball-game matches at the corresponding multiple ball-game fields, and wherein the system simultaneously analyzes the multiple pluralities of images thereof.

2. The system of claim 1, further comprising a classification module coupled to the database and to the events detection module, the classification module to generate, based on at least some images of the plurality of images and the predetermined ball-game rules, classified images of the at least some images thereof.

3. The system of claim 2, wherein each image of the classified images comprises multiple patches of pixels, and wherein each patch of pixels of the multiple patches of pixels is represented as a specific class of objects of predetermined classes of objects related to the ball-game.

4. The system of claim 1, wherein the events analysis module to determine, based on the based on predetermined ball-game rules, at least one reference pattern of the second event, wherein the second event is subsequent to the specified rule-based event according to the predetermined ball-game rules.

5. The system of claim 4, wherein the events analysis module to analyze the images of the second subset, based on the at least one reference pattern, to thereby verify that the second event is conformal with the at least one reference pattern, and further to determine, upon the verification thereof, the referee's decision concerning the first event.

6. The system of claim 1, further comprising an output module coupled to the events detection module and to the events analysis module, the output module to generate, based on the referee's decision concerning the first event, at least one output related to the first event.

7. The system of claim 6, wherein the at least one output comprises at least one of:
a notification concerning the first event during the ball-game, at least one video clip representing the first event, update of a digital specified rule-based events table.

8. The system of claim 1, further comprising at least one set of at least one camera located at the ball-game field, wherein the at least one camera is to generate a plurality of real-time images of the ball-game field during an actual ball-game match and to deliver the plurality of real-time images thereof to the database.

9. A method of an automatic detection of referee's decisions during a ball-game match, the method comprising:
receiving a plurality of images of a ball-game field generated during the ball-game match;

determining, based on predetermined ball-game rules, a first subset of images of the plurality of images representing a first event that is suspected as a specified rule-based event;

determining, based on the predetermined ball-game rules, a second subset of images of the plurality of images that represents a second event, wherein the second event is subsequent to the specified rule-based event according to the predetermined ball-game rules;

analyzing, based on the predetermined ball-game rules, the images of the second subset and further determining, based on the analysis thereof, a referee's decision concerning whether the first event is the specified rule-based event; and providing multiple sets of at least one camera, wherein each of the multiple sets thereof is located at a different ball-game field of corresponding multiple ball-game fields, and configured to generate corresponding multiple pluralities of images of corresponding multiple ball-game matches at the corresponding multiple ball-game fields, and wherein the method simultaneously analyzes the multiple pluralities of images thereof.

10. The method of claim 9, further comprising generating, by a classification module, based on at least some images of the plurality of images and the predetermined ball-game rules, classified images of the at least some images thereof.

11. The method of claim 10, wherein each image of the classified images comprises multiple patches of pixels, and wherein each patch of pixels of the multiple patches of pixels is represented as a specific class of objects of predetermined classes of objects related to the ball-game.

12. The method of claim 9, further comprising determining, by an events analysis module, based on the predetermined ball-game rules, at least one reference pattern of the second event, wherein the second event is subsequent to the specified rule-based event according to the predetermined ball-game rules.

13. The method of claim 12, further comprising analyzing, by the events analysis module, the images of the second subset, based on the at least one reference pattern, to thereby verify that the second event is conformal with the at least one reference pattern, and further determining, upon the verification thereof, the referee's decision concerning the first event.

14. The method of claim 9, further comprising generating, by an output module, based on the referee's decision concerning the first event, at least one output related to the first event.

15. The method of claim 14, wherein the at least one output comprises at least one of: a notification concerning the first event during the ball-game, at least one video clip representing the first event, update of a digital specified rule-based events table.

* * * * *